United States Patent [19]

Askew

[11] 4,406,569
[45] Sep. 27, 1983

[54] TOGGLE NUT

[76] Inventor: Henry E. Askew, 1249 S. 50th St., Birmingham, Ala. 35222

[21] Appl. No.: 220,986

[22] Filed: Dec. 29, 1980

[51] Int. Cl.³ .............................................. F16B 13/04
[52] U.S. Cl. ..................................................... 411/346
[58] Field of Search ................................ 411/340-346, 411/516, 520, 523, 529, 352

[56] References Cited

U.S. PATENT DOCUMENTS

| | | |
|---|---|---|
| 870,820 | 11/1907 | Ellis . |
| 918,063 | 4/1909 | Klahre .................................. 411/345 |
| 1,373,188 | 3/1921 | Goewey . |
| 1,374,924 | 4/1921 | Karitzky . |
| 1,374,950 | 4/1921 | Pleister . |
| 1,374,959 | 4/1921 | Sherwood et al. . |
| 1,694,494 | 12/1928 | Tomkinson . |
| 1,733,693 | 10/1929 | Porter ............................ 411/346 X |
| 2,144,895 | 1/1939 | Place . |
| 2,408,572 | 10/1946 | Morehouse ...................... 411/516 X |
| 2,519,511 | 8/1950 | Stelter ................................... 411/342 |
| 2,565,391 | 8/1951 | Molat . |
| 2,937,682 | 5/1960 | Patten .................................. 411/112 |
| 3,031,217 | 4/1962 | Tinnerman ...................... 411/516 X |
| 3,127,807 | 4/1964 | Modrey ............................. 411/340 |
| 3,264,699 | 8/1966 | Knowlton ....................... 411/526 X |
| 3,312,983 | 4/1967 | Jansson et al. .................. 411/520 X |
| 3,878,755 | 4/1975 | Coffey ............................... 411/340 |
| 3,946,636 | 3/1976 | Grey . |
| 4,120,231 | 10/1978 | Neumayer ......................... 411/340 |
| 4,283,986 | 8/1981 | Peterson et al. ................ 411/346 X |
| 4,298,298 | 11/1981 | Pontone ............................. 411/342 |

FOREIGN PATENT DOCUMENTS

| | | | |
|---|---|---|---|
| 911832 | 11/1962 | United Kingdom ................ 411/520 |
| 1002898 | 9/1965 | United Kingdom ................ 411/520 |

*Primary Examiner*—Cornelius J. Huser
*Assistant Examiner*—Lloyd A. Gall
*Attorney, Agent, or Firm*—C. A. Phillips

[57] ABSTRACT

A toggle nut which is to be used in fastening objects to a blind partition, door, or wall.

The toggle nut is a short, U-shaped channel with neither the inner width nor the depth being of greater dimension than the diameter of a threaded member which the channel is to receive. An elongated triangular aperture is located centrally in the base of the channel, with the long point of the aperture pointing toward an extension of the base. This extension abruptly turns up and back at a 180 degree semi-circular angle, terminating across the aperture. The terminal end of the base extension has a shallow semi-circular indentation.

The open edges of the channel, along the length of the sides, are depressed slightly below points at the four corners of the sides. These points are designed to dig into the inner surface of the partition on which the toggle nut is being used.

The tip of a threaded member is inserted through the aperture, under the clip, and is aligned in the channel. The toggle nut and the threaded member are inserted through a hole in a partition. The spring clip action will align the toggle nut parallel to the inner surface and the four raised corners will prevent spin of the toggle nut as the threaded member is tightened.

4 Claims, 5 Drawing Figures

TOGGLE NUT

FIELD OF INVENTION

This invention is a new design for a toggle nut, to be used for attaching objects or material to hollow core doors, wall partitions, or any surface that requires a blind fastener.

DISCUSSION OF PRIOR ART

Presently there are several types of toggle bolts available, and following is listed what the inventor considers to be the better of these toggle bolts. After each toggle bolt listed below, an analysis is given of the negative features which are overcome by the inventor's toggle nut.

1. Winged spring toggle bolt—This toggle bolt is relatively expensive, requires a bolt threaded the same as the nut, and requires a hole which is over twice the diameter of the bolt.

2. Molly type—This toggle bolt is relatively expensive, and once the nut section is compressed into place, it cannot be removed at some later date, except to be dug out. Usually a different length nut section is required for different partition thicknesses.

3. Anchor bolt or expansion sheath—This type is often ineffective when used overhead, when used in a very thin partition, or when used against a direct pull, particularly in plaster or sheetrock.

4. Plastic wing nut—This nut is relatively expensive and requires a hole over twice the diameter of the bolt.

The inventor's toggle nut has a unique design which permits it to accept different sizes of bolts with different thread pitches. This spring clip toggle nut provides positive support regardless of the direction of pull, it requires a hole only slightly larger than the diameter of the bolt, and is effective in partitions of varying thicknesses.

OBJECTS OF THE INVENTION

The objects of the toggle nut are:

1. To provide means for attaching an object to a partition, hollow core door, plaster or sheetrock wall, or to any surface that requires a blind fastener.

2. To provide a simple device as described above which will give positive fastening, yet will require a hole only slightly larger than the diameter of the bolt, and is effective in partitions of varying thicknesses.

3. To provide a toggle nut at a minimal cost, yet one which is durable and strong.

These and other objects and advantages will become readily apparent in the details of construction and operation as more fully hereinafter described and claimed.

DRAWINGS

Reference is now made to the accompanying drawings which form a part of these specifications. In these drawings like numerals refer to like parts throughout, and in which.

DESCRIPTION

Figure 1:
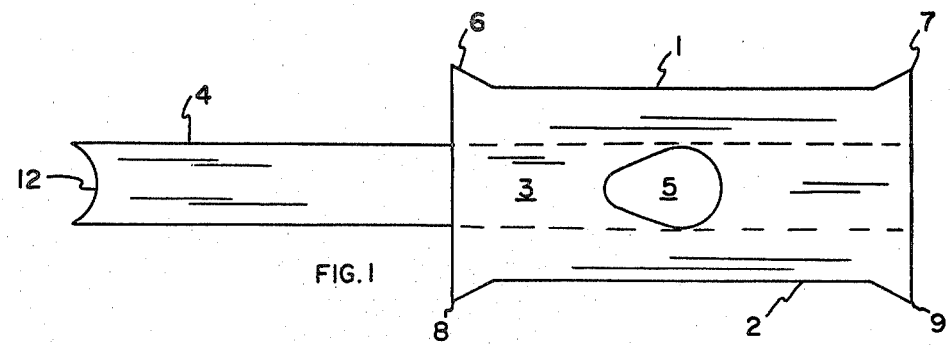
FIG. 1 is an outline of a stamped metal toggle nut, before being formed.
Figures 2, 3:
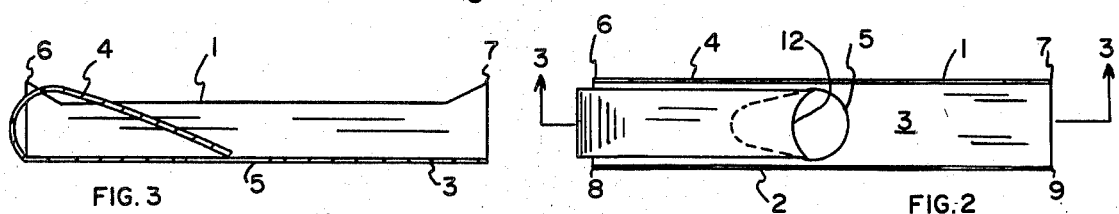
FIG. 2 is a top view of the toggle nut.
FIG. 3 is a side view, partially cut away, taken along line 3—3 of the completed toggle nut, showing the position of the spring clip.
Figure 4:
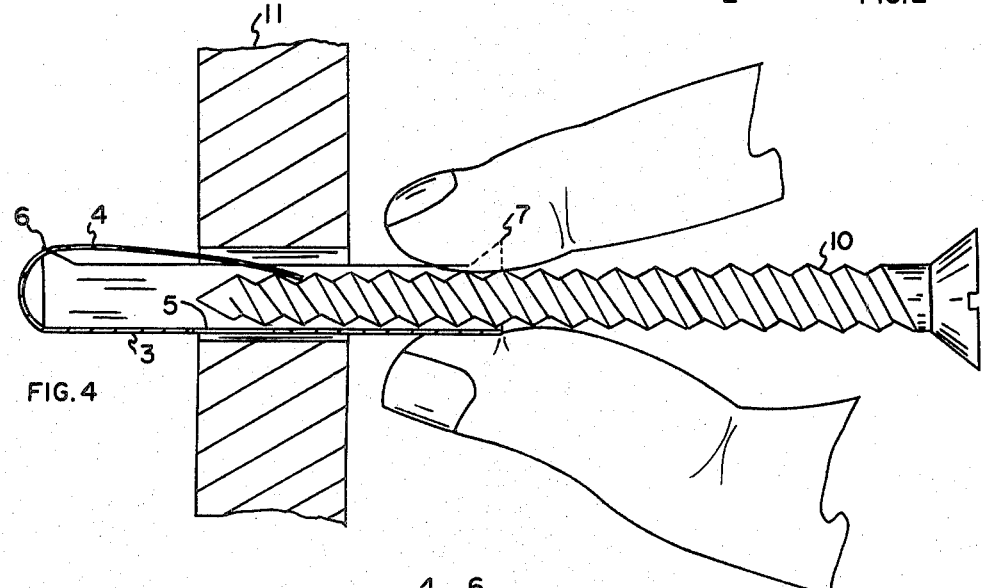
FIG. 4 is an exposed side view of the toggle nut with a threaded member therein, with said toggle nut being inserted through a partition.
Figure 5:
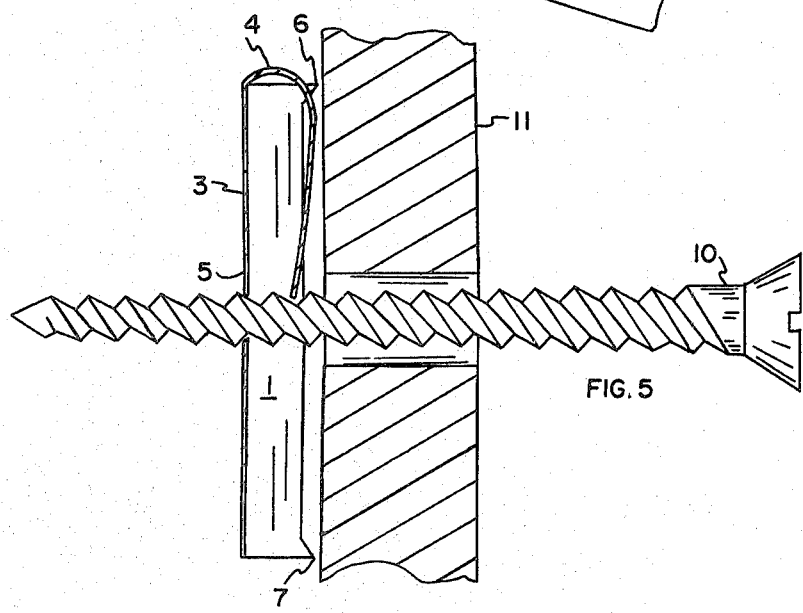
FIG. 5 is a cut-a-way view of the toggle nut, in place, after insertion through a partition.

The toggle nut is a one piece, short, U-shaped channel, composed of suitable metal or plastic, composed of base 3, a side 1, a side 2, spring clip 4, and aperture 5.

Spring clip 4 is formed as an extension of base 3, and said clip turns sharply up and back from base 3, thereby forming a 180 degree semi-circle so that the end of said clip 4 touches and covers approximately two-thirds of aperture 5. The end of spring clip 4 is formed with a shallow, circular indentation 12.

OPERATION

The tip of threaded member 10 is inserted under the end of spring clip 4 and thence through aperture 5. Assuming a right-hand thread, one or two right turns are made with threaded member 10, thus engaging threaded member 10 between the end of spring clip 4 and the broad end of aperture 5.

With threaded member 10 thus securely engaged, pressure is exerted on the underside of base 3 with the thumb, simultaneously as pressure is exerted by a finger on threaded member 10, thereby forcing threaded member 10 into a position between sides 1 and 2, parallel to base 3. As threaded member 10 is pressed into this parallel position, spring clip 4 will be raised, with tension being exerted down on the tip of said threaded member 10.

With the toggle nut held with the threaded member 10 in this parallel position, said toggle nut is inserted into a previously drilled hole through partition 11. After insertion of the toggle nut and threaded member 10 as deeply as possible, insertion is completed by removing the thumb and finger as previously positioned, then pushing threaded member 10 until the trailing end of the toggle nut clears the inner side of partition 11.

Immediately after clearing the inner side of partition 11, the toggle nut will be brought into a position parallel to the inner side of said partition 11. This movement to a parallel position by the toggle nut is effected by the pressure of the end of spring clip 4 against the tip of threaded member 10.

Threaded member 10 is then pulled lightly and is threadily engaged to the depth desired. Points 6, 7, 8, and 9 will press into the inner side of partition 11, and will prevent the toggle nut from rotating as threaded member 10 is threadily engaged. As a result of the tension of spring clip 4, constant and increased pressure will be exerted on threaded member 10, particularly so when the diameter of the shank of threaded member 10 increases as threaded member 10 is fully engaged.

What I claim as new is an improved toggle nut described as follows:

1. A toggle bolt assembly comprising:
    an elongated rectangular U-shaped channel having a base and a pair of oppositely positioned side walls, said base having a centrally located opening, and at least one of said side walls having a raised pointed region;
    a single leaf spring extending from an end of said base and an end of said spring being sprung back over the base to provide a spring bias adjacent to and toward said opening in said base;

an elongated screw having a tapered threaded end, said screw being threadably engaged between said end of said spring and an edge of said opening; and the end of said spring and the edge of said opening providing the sole threaded receiver for said screw.

2. A toggle bolt assembly as set forth in claim 1 wherein said end of said leaf spring biasing toward said opening has a semi-circular notch therein sized to threadably engage said screw.

3. A toggle bolt assembly as set forth in claim 2 wherein said edge of said opening is concave.

4. A toggle bolt assembly as set forth in claim 3 wherein said channel and said leaf spring are constructed of a unitary piece of metal.

* * * * *